US011252786B2

(12) United States Patent
Nolan et al.

(10) Patent No.: US 11,252,786 B2
(45) Date of Patent: *Feb. 15, 2022

(54) IOT NETWORKING EXTENSION WITH BI-DIRECTIONAL PACKET RELAY

(71) Applicant: INTEL CORPORATION, Santa Clara, CA (US)

(72) Inventors: Keith Nolan, Mullingar (IE); Mark Kelly, Leixlip (IE); Charlie Sheridan, Ballivor (IE)

(73) Assignee: Intel Corporation, Santa Clara, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/596,436

(22) Filed: Oct. 8, 2019

(65) Prior Publication Data

US 2020/0146106 A1    May 7, 2020

Related U.S. Application Data

(63) Continuation of application No. 15/859,438, filed on Dec. 30, 2017, now Pat. No. 10,455,640.

(51) Int. Cl.
| | | |
|---|---|---|
| *H04W 88/04* | (2009.01) | |
| *H04W 76/12* | (2018.01) | |
| *H04W 8/14* | (2009.01) | |
| *H04B 7/155* | (2006.01) | |
| *H04B 7/26* | (2006.01) | |
| *H04W 84/18* | (2009.01) | |
| *H04W 8/00* | (2009.01) | |

(52) U.S. Cl.
CPC ............ *H04W 88/04* (2013.01); *H04B 7/155* (2013.01); *H04B 7/15528* (2013.01); *H04B 7/2606* (2013.01); *H04W 8/14* (2013.01); *H04W 76/12* (2018.02); *H04W 8/005* (2013.01); *H04W 84/18* (2013.01)

(58) Field of Classification Search
CPC ....... H04W 88/04; H04W 76/12; H04W 8/14; H04W 84/18; H04W 8/005; H04B 7/2606; H04B 7/15528; H04B 7/155
See application file for complete search history.

(56) References Cited

U.S. PATENT DOCUMENTS

| | | | |
|---|---|---|---|
| 10,320,586 B2 | 6/2019 | Henry et al. | |
| 10,455,640 B2 | 10/2019 | Nolan et al. | |
| 10,470,146 B2* | 11/2019 | Lalam | H04W 56/0015 |
| 10,477,540 B2* | 11/2019 | Chen | H04B 7/2606 |
| 10,733,857 B1* | 8/2020 | Siminoff | H04L 67/2857 |
| 10,824,140 B2* | 11/2020 | Cella | G05B 23/0283 |
| 2012/0127888 A1* | 5/2012 | Fujishima | H04W 72/085 370/252 |

(Continued)

OTHER PUBLICATIONS

"U.S. Appl. No. 15/859,438, Non Final Office Action dated Jan. 2, 2019", 8 pgs.

(Continued)

*Primary Examiner* — Jay P Patel
(74) *Attorney, Agent, or Firm* — Schwegman Lundberg & Woessner, P.A.

(57) ABSTRACT

An Internet of Things (IoT) device includes a transceiver to transmit and receive data packets. The IoT device also includes a controller to alternate between upstream and downstream relaying of data packets via the transceiver.

22 Claims, 13 Drawing Sheets

(56) References Cited

U.S. PATENT DOCUMENTS

| | | | |
|---|---|---|---|
| 2017/0140645 A1 | 5/2017 | Balid et al. | |
| 2017/0171868 A1 | 6/2017 | Reis et al. | |
| 2017/0188377 A1 | 6/2017 | Reis et al. | |
| 2017/0332462 A1 | 11/2017 | Tikkanen | |
| 2018/0097690 A1 | 4/2018 | Yocam et al. | |
| 2018/0176862 A1 | 6/2018 | Malas et al. | |
| 2018/0255479 A1 | 9/2018 | Markham et al. | |
| 2019/0037639 A1 | 1/2019 | Nolan et al. | |
| 2019/0045378 A1* | 2/2019 | Rosales | G08G 1/0145 |
| 2019/0045519 A1* | 2/2019 | Hall | H04B 1/715 |
| 2019/0053180 A1* | 2/2019 | Lalam | H04J 3/0635 |
| 2019/0158975 A1* | 5/2019 | Petersen | H04W 4/70 |
| 2019/0349426 A1* | 11/2019 | Smith | H04W 84/22 |
| 2019/0349733 A1* | 11/2019 | Nolan | H04W 12/69 |
| 2020/0037318 A1* | 1/2020 | Chen | H04W 76/14 |
| 2020/0265288 A1* | 8/2020 | Volkerink | B32B 37/12 |
| 2020/0275273 A1* | 8/2020 | Smith | H04W 12/35 |
| 2020/0374205 A1* | 11/2020 | Sharma | H04L 43/065 |

OTHER PUBLICATIONS

"U.S. Appl. No. 15/859,438, Response filed Apr. 2, 2019 to Non Final Office Action dated Jan. 2, 2019", 13 pgs.

"U.S. Appl. No. 15/859,438, Notice of Allowance dated Jun. 24, 19", 8 pgs.

\* cited by examiner

400

IOT NETWORKING EXTENSION WITH BI-DIRECTIONAL PACKET RELAY

CROSS REFERENCE TO RELATED APPLICATION

The present application claims the benefit of the filing date of U.S. patent application Ser. No. 15/859,438, by Keith Nolan et al., entitled "IoT Networking Extension With Bi-Directional Packet Relay," filed Dec. 30, 2017, and which is incorporated herein by reference.

TECHNICAL FIELD

The present techniques relate generally to Internet of Things (IoT) devices, including, for example, IoT devices that can perform remote sensing and actuation functions. More specifically, the present techniques relate to IoT networking extension with bi-directional relay.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
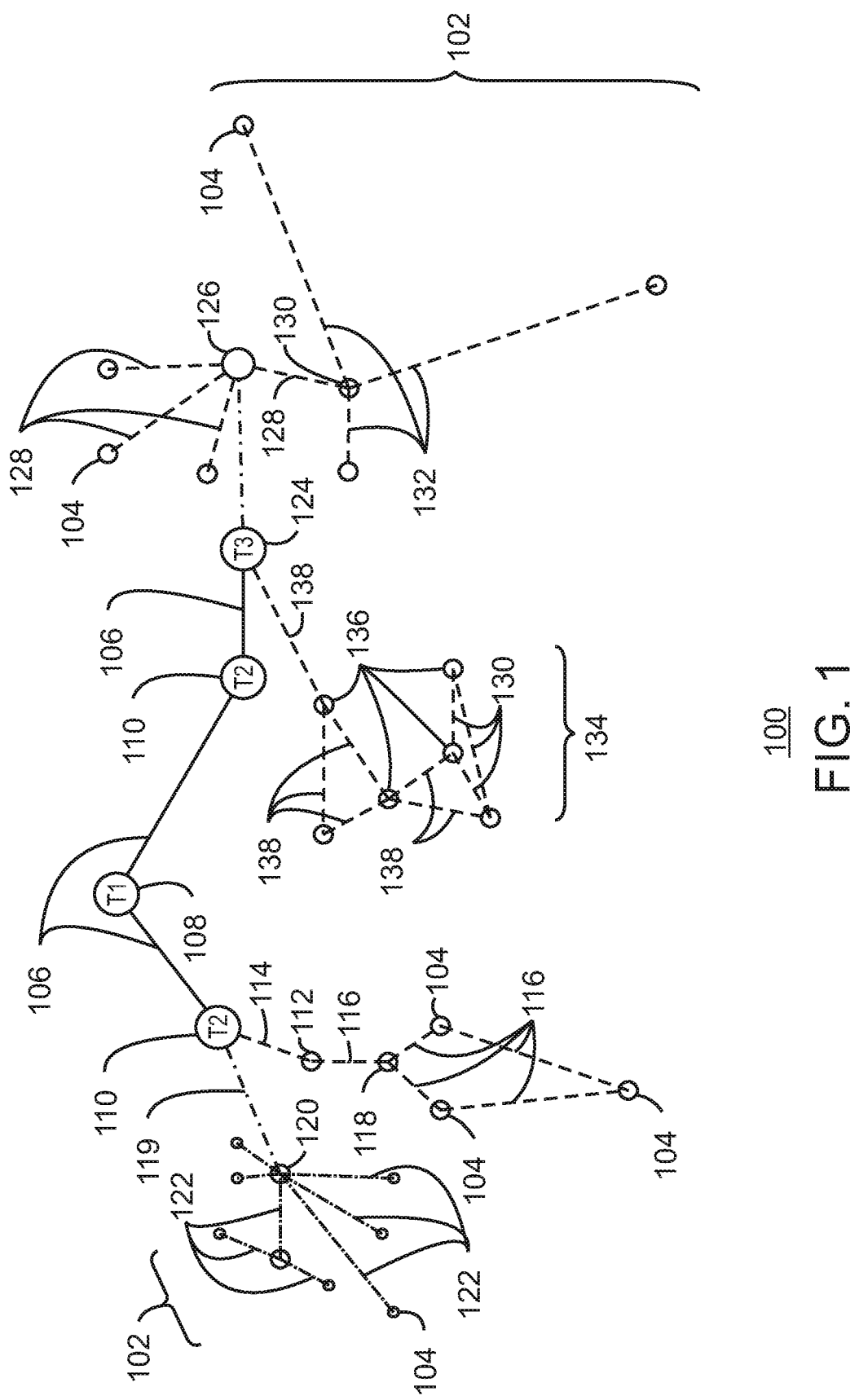
FIG. 1 illustrates interconnections that may be present in the Internet in accordance with some embodiments.

Some embodiments related to IoT networks that are extended via wireless links across a large geographically dispersed area, or across one or more buildings or subterranean zones, or other areas not serviced by alternative wireless infrastructure. Some embodiments relate to an IoT network that is extended across a geographical area the size of the state of Rhode Island. Some embodiments relate to a heterogeneous fog network using low power wireless networking as interconnects between nodes, where the distances between nodes can be over large geographic areas or deep in-building or underground without any other networking infrastructure.

Some embodiments relate to alternating between upstream relaying of data packets and downstream relaying of data packets. It is noted that data packet is used herein to include any information that might be sent between IoT devices, such as sensor data, image data, etc., and also messages, message information, control commands, and any other information packets sent between devices such as, for example, any IoT devices.

For example, in some embodiments, a relay node can use a single transceiver to act as a relay in an upstream manner (for example, from an edge device to a fog node such as a fog controller), and can alternate to also act as a relay in a downstream manner (for example, from a fog node such as a fog controller to an edge device). Some embodiments can use a waveform inversion technique and time triggered networking that takes advantage of IQ (Inphase and Quadrature) polarity to differentiate and detect upstream and downstream messages. In some embodiments, a low-overhead framing structure extension may be implemented to support bi-directional relaying over heterogeneous networks (for example, heterogeneous Internet Protocol (IP) networks or heterogeneous non-IP networks) connected via network address translation bridges.

FIGS. 1-4 include example operating environments such as Internet of Things (IoT) environments which may utilize principles described herein. The example operating environments of FIGS. 1-4 may utilize principles described herein of data packet relay control in an IoT network (for example, for IoT devices, fog devices, fog networks, edge devices, edge networks, foglets, etc.) as illustrated in FIGS. 5-13 and described in reference thereto.

The Internet of Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 2:
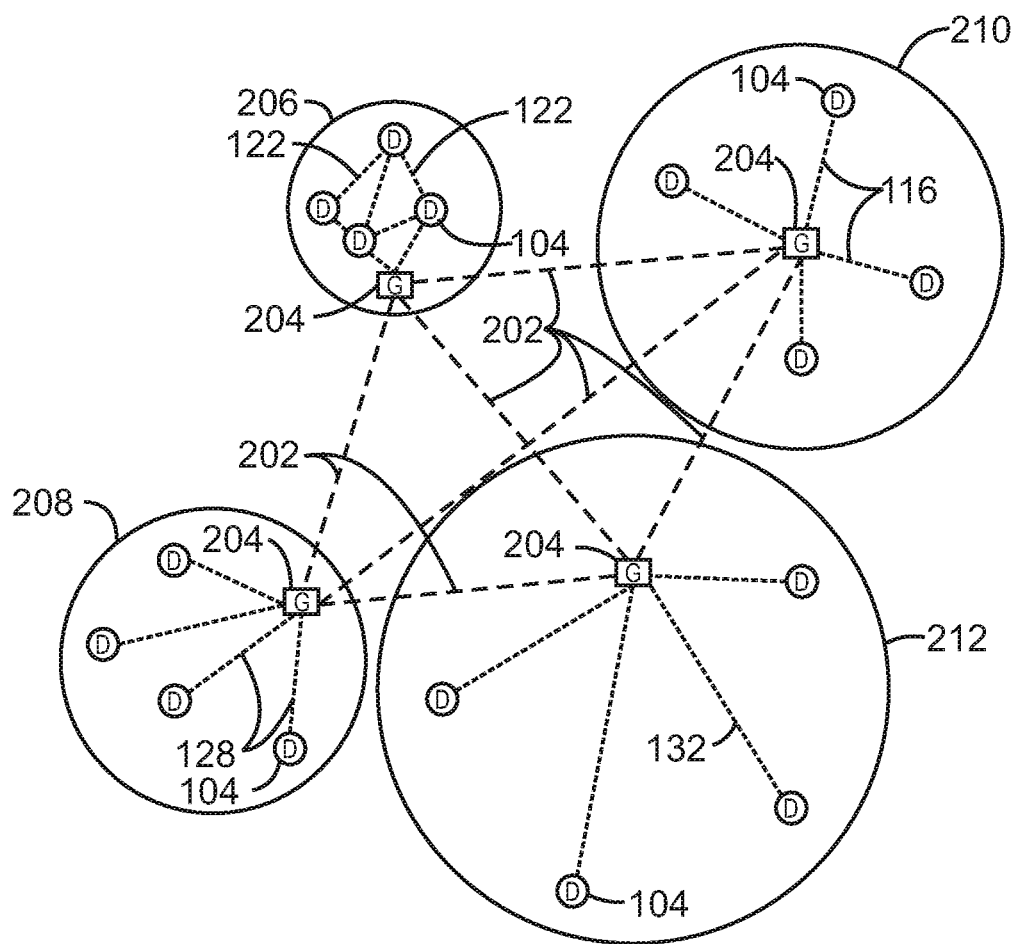
FIG. 2 illustrates a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWAN specification promulgated by the LoRa Alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 12.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
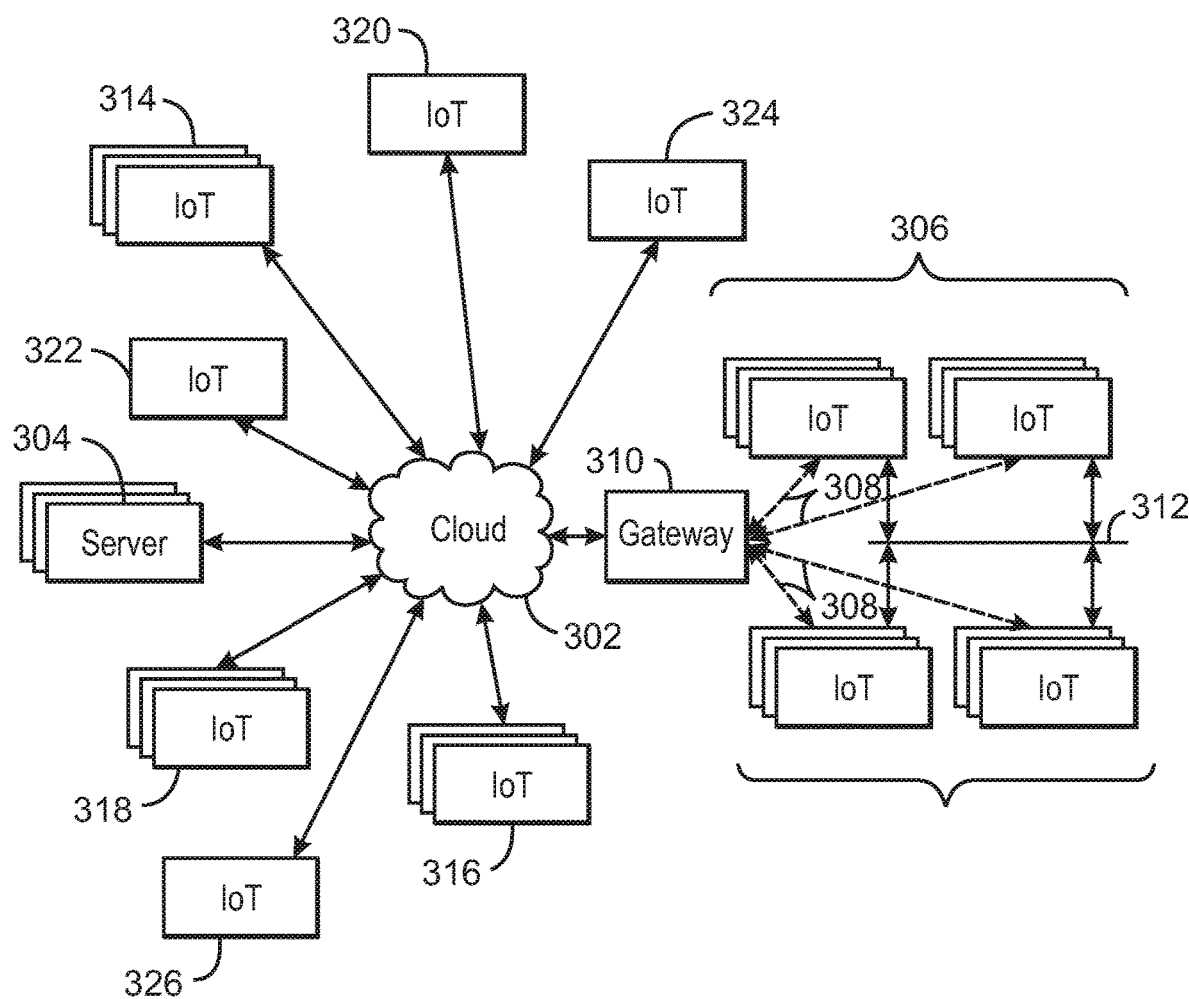
FIG. 3 illustrates a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
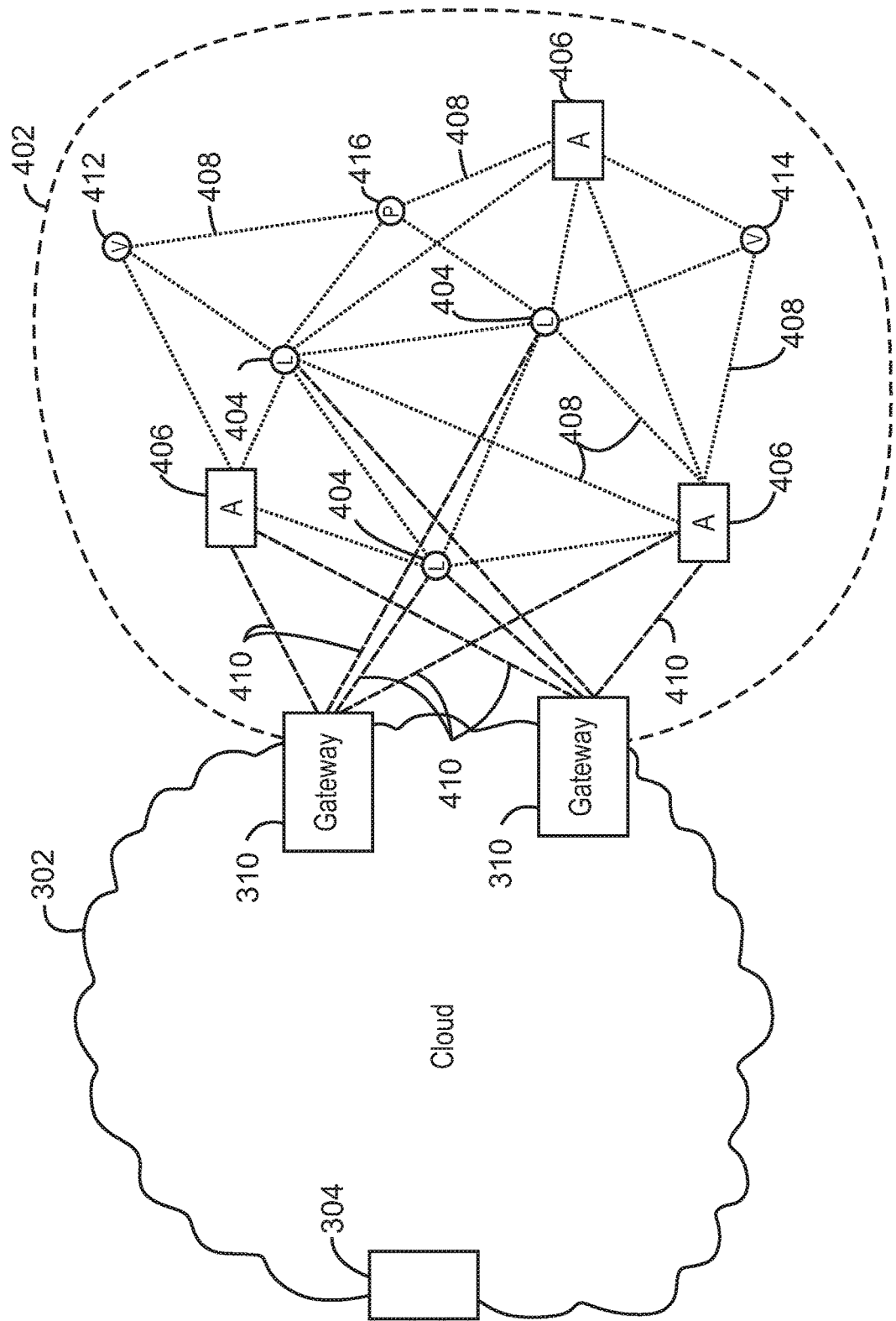
FIG. 4 illustrates a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, seismic measurement, traffic analyses, security monitoring, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection and interoperability protocols may also be used, including, for example, the Open Platform Communications (OPC) Unified Architecture released in 2008 by the OPC Foundation, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Networks of devices may be provided in a multi-access edge computing (MEC) environment. Multi-access edge computing (MEC), also referred to as mobile edge computing, may offer application developers and content providers cloud-computing capabilities and an information technology service environment at the edge of a network. An MEC system may include an MEC orchestrator, and an MEC platform manager, which manage the provision of a service to a user equipment (UE) device, by a service provider, through one or more access points, or one or more MEC hosts.

The MEC environment may be part of a radio access network (RAN) that has been opened to third party providers, such as clearing houses for blockchain transactions. The RAN may provide a high bandwidth, low latency system that allows fog devices 402 to function more efficiently with applications and services in the cloud 302. Accordingly, MEC 302 may be seen as a cloud or fog server running at the edge of a mobile network and performing tasks that may not be achieved with traditional network infrastructure. Machine-to-Machine gateway and control functions, such as the IoT device examples described with respect to FIGS. 3 and 4, are one example. In an MEC network, processing power, such as servers, are moved closer to the edge of networks. For example, the aggregators 406 located within the fog device 402.

Figure 5:
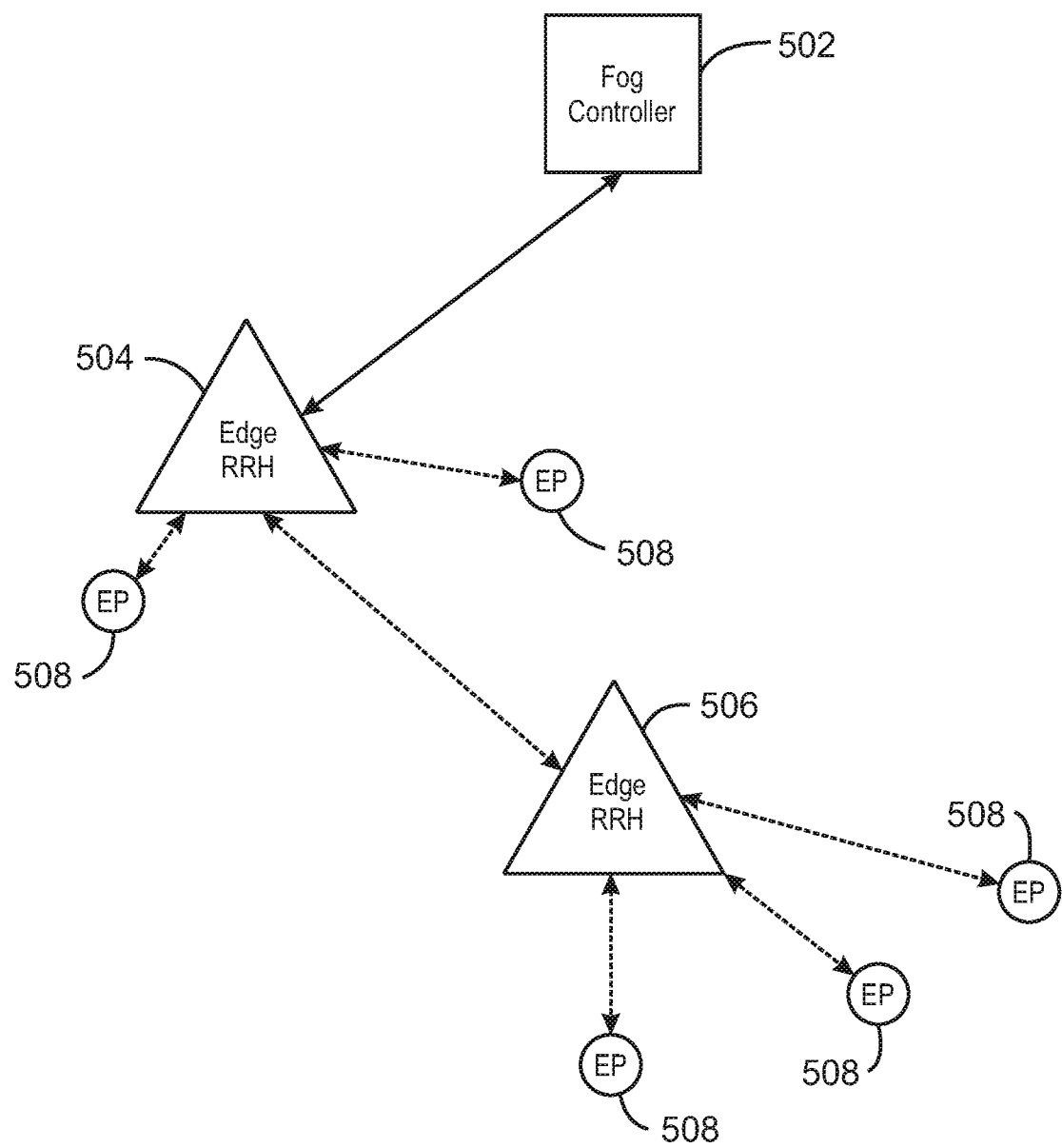
FIG. 5 illustrates an IoT network including bi-directional relay in accordance with some embodiments.

FIG. 5 illustrates an IoT network 500 with bi-directional relay. In some embodiments, network 500 includes an IoT controller 502, an IoT remote radio head (RRH) 504, an IoT remote radio head (RRH) 506, and IoT endpoints 508. In some embodiments, one or more of the controller 502, RRH 504, RRH 506, or endpoints 508 can be an IoT device (for example, an IoT device such as the IoT device 1200 of FIG. 12). In some embodiments, IoT network 500 can be a fog/edge network. In some embodiments, controller 502 can be a fog controller. In some embodiments, controller 502 can be a fog network controller. In some embodiments, controller 502 can be a fog server controller In some embodiments, RRH 504 can be an edge RRH (for example, an edge RRH operating in a normal non-relay mode or in a relay mode such as a bi-directional relay mode). In some embodiments, RRH 506 can be an edge RRH (for example, an edge RRH operating in a normal non-relay mode or in a relay mode such as a bi-directional relay mode). In some embodiments, one or more of RRH 504 and RRH 506 is a remote relay head acting as a relay point for range extension. In some embodiments, the interconnect between controller 502 and RRH 504 can be a PoE (power over Ethernet) wired connection. In some embodiments, the interconnect between controller 502 and RRH 504 can be a wired or wireless connection.

In some embodiments, network 500 can be a fog/edge network that is extended via wireless links across a large geographically dispersed area, or across one or more buildings or subterranean zones, or other areas not serviced by alternative wireless infrastructure. In some embodiments, network 500 is a network that is extended across a geographical area the size of the state of Rhode Island. In some embodiments, network 500 is a heterogeneous fog network using low power wireless networking as interconnects between nodes (for example, between RRH 504 and RRH 506, or between an RRH 504 or 506 and an endpoint 508). These distances between nodes can be over large geographic areas or deep in-building or underground without other networking infrastructure.

In some embodiments, RRH 504 or RRH 506 can alternate between upstream relaying and downstream relaying. For example, in some embodiments, RRH 504 or RRH 506 can be a relay node that can use a single transceiver to act as a relay in an upstream manner (for example, from an edge device to a fog node such as a fog controller), and can alternate to also act as a relay in a downstream manner (for example, from a fog node such as a fog controller to an edge device). In some embodiments, a low-overhead framing structure extension may be implemented to support bi-directional relaying over heterogeneous networks (for example, heterogeneous Internet Protocol networks or heterogeneous IP networks) connected via network address translation bridges.

Upstream and downstream IoT messages can be modulated in slightly different ways. For example, the polarity of the downstream waveform can be inverted from the polarity of the upstream waveform. Therefore, some embodiments can use a waveform inversion technique and time triggered networking that takes advantage of IQ (In-phase and Quadrature) polarity to differentiate and detect upstream and downstream messages. In some embodiments, RRH 504 can operate in a timestamped transmit mode in which IQ polarity is inverted, and RRH 506 can operate in an immediate mode in which IQ polarity is normal. In some embodiments, upstream/downstream mode of RRH 504 or RRH 506 can be changed by switching the receiver IQ polarity.

A range of network 500 can be extended by 3× using a wireless point to point or point to multipoint network with two RRH relay devices. In some embodiments, additional RRH devices can be added to the network 500 in order to extend the range of the network 500 even further. In some embodiments, edge and fog networks can be formed even though nodes are dispersed widely over a large geographic area (for example, over tens of kilometers between nodes, or deployed in hazardous or otherwise difficult environments (for example, such as a jungle, outer space, high radiation areas, over water, among others).

In some embodiments, RRH 504 or RRH 506 can be used as a relay device. The RRH can activate a transceiver and enable an upstream or downstream mode to start (that is, the direction in which to listen for data packets that require relaying support). If a buffer of the RRH contains packets, a frame integrity check can be performed to determine if the fame(s) is valid, and invalid frames can be dropped. A valid frame for relaying can be passed to a stage that populates field values used by the recipient to determine the nature of the data packet (for example, is it a relayed data packet or a normal data packet), and the packet is sent for transmission. The RRH can then be switched to the other (upstream or downstream mode). Although the term data packet is used herein, it is noted that data packet can include any information that might be sent between IoT devices, such as sensor data, image data, etc., and also message information, control commands, and any other information packets sent between devices such as, for example, any IoT devices.

Figure 6:
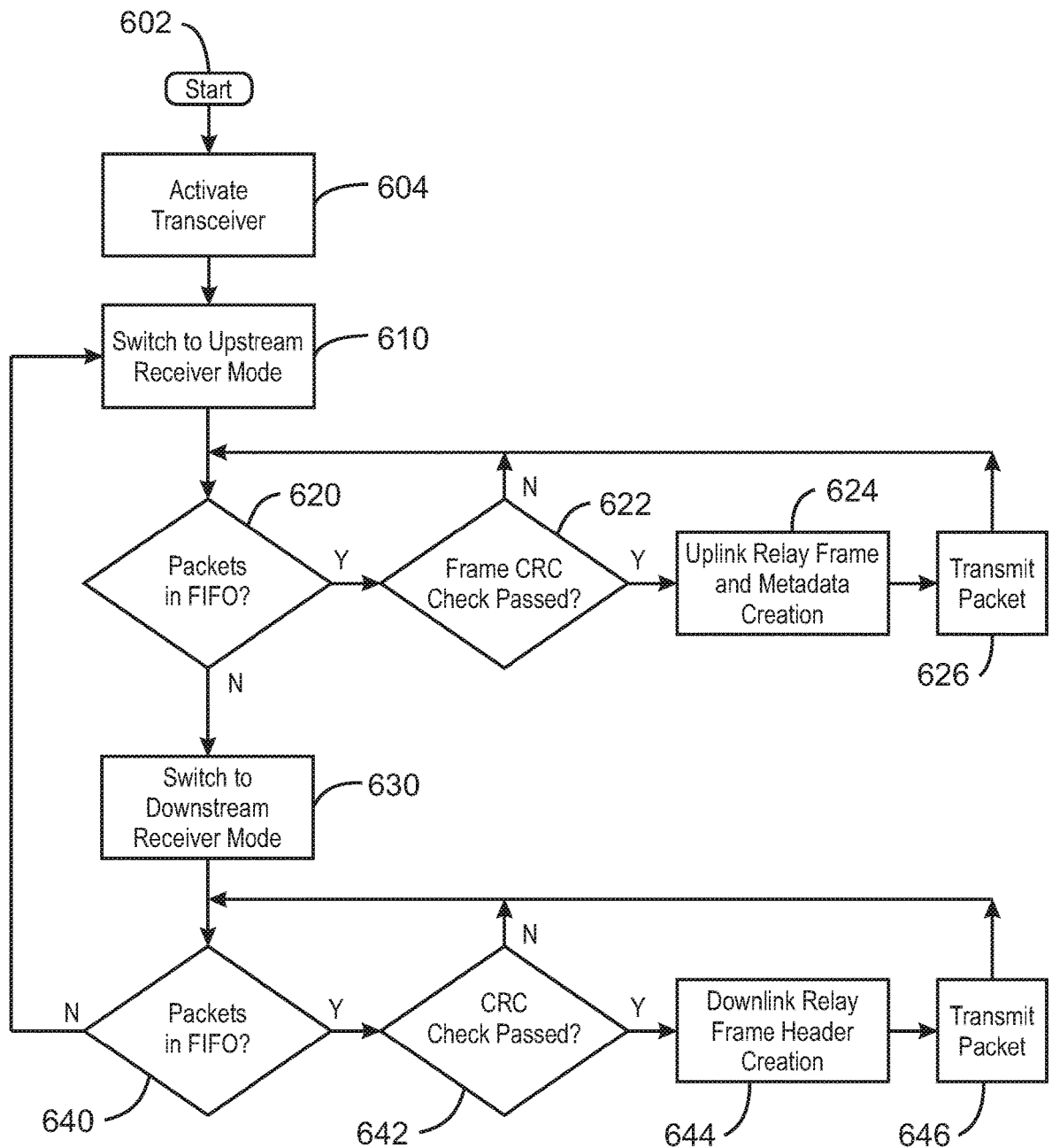
FIG. 6 illustrates relay control in accordance with some embodiments.

FIG. 6 illustrates relay control 600 in accordance with some embodiments. In some embodiments, relay control 600 includes relay control and packet queue checking. In some embodiments, relay control 600 implements IoT device relay control. In some embodiments, relay control 600 can be implemented by one or more remote radio head (RRH) node operating in a relay mode such as, for example, RRH 504 or RRH 506.

Relay control 600 begins at 602. A transceiver of the relay device is activated at 604. In some embodiments an upstream mode or a downstream mode is enabled first. In some embodiments, the upstream mode or downstream mode is enabled based on the direction in which to listen for packets that require relay support. In some embodiments using LoRaWAN, for example, the upstream or downstream mode can be selected by switching the receiver IQ polarity through a registry write operation, for example. Relay control 600 illustrates first enabling an upstream mode, but it is noted that a downstream mode is enabled first in some embodiments.

Relay control 600 is switched to an upstream receiver mode at 610. At 620 a determination is made as to whether an upstream buffer (for example, a first in first out or FIFO buffer) contains packets. If the upstream buffer does contain packets at 620, a frame integrity check is performed to determine if the frame(s) is/are valid, and invalid frames can be dropped. For example, a frame CRC check can be performed, and a determination is made at 622 as to whether the frame CRC check passed. If the frame CRC check does not pass at 622, flow returns to 620. If the frame CRC check does pass at 622, a relay frame and metadata are created at 624. This metadata can include, for example, a set of control parameters that tell the radio how to treat the packet that needs to be transmitted. For example, a valid frame for relaying is passed to a stage that populates field values that are used by the recipient to determine the nature of the packet (for example, whether it is a relayed packet or a normal packet). The packet is then sent to the transceiver module and the packet is transmitted at 626. Flow then returns to 620.

If the buffer does not contain any packets at 620, the relay control switches the device to a downstream receiver mode at 630. If a downstream buffer (for example, downstream FIFO buffer) contains packets, they are validated and dispatched for relay transmission. At 640 a determination is made as to whether the downstream buffer (for example, a first in first out or FIFO buffer) contains packets. If the buffer does contain packets at 640, a frame integrity check is performed to determine if the frame(s) is/are valid, and invalid frames can be dropped. For example, a frame CRC check can be performed, and a determination is made at 642 as to whether the frame CRC check passed. If the frame CRC check does not pass at 642, flow returns to 640. If the frame CRC check does pass at 642, a downlink relay frame header is created at 644. For example, a valid frame for relaying is passed to a stage that populates field values that are used by the recipient to determine the nature of the packet (for example, whether it is a relayed packet or a normal packet). The packet is then sent to the transceiver module and the packet is transmitted at 646. Flow then returns to 640. If the buffer does not contain any more packets at 640, relay control 600 flow returns the device to the upstream receiver mode at 610.

In this manner, according to some embodiments, relay control 600 can alternate between upstream relaying and downstream relaying using a single transceiver. Relay control 600 can use waveform inversion and time-triggered networking according to some embodiments to use IQ polarity to differentiate and detect upstream and downstream messages.

Figure 7:
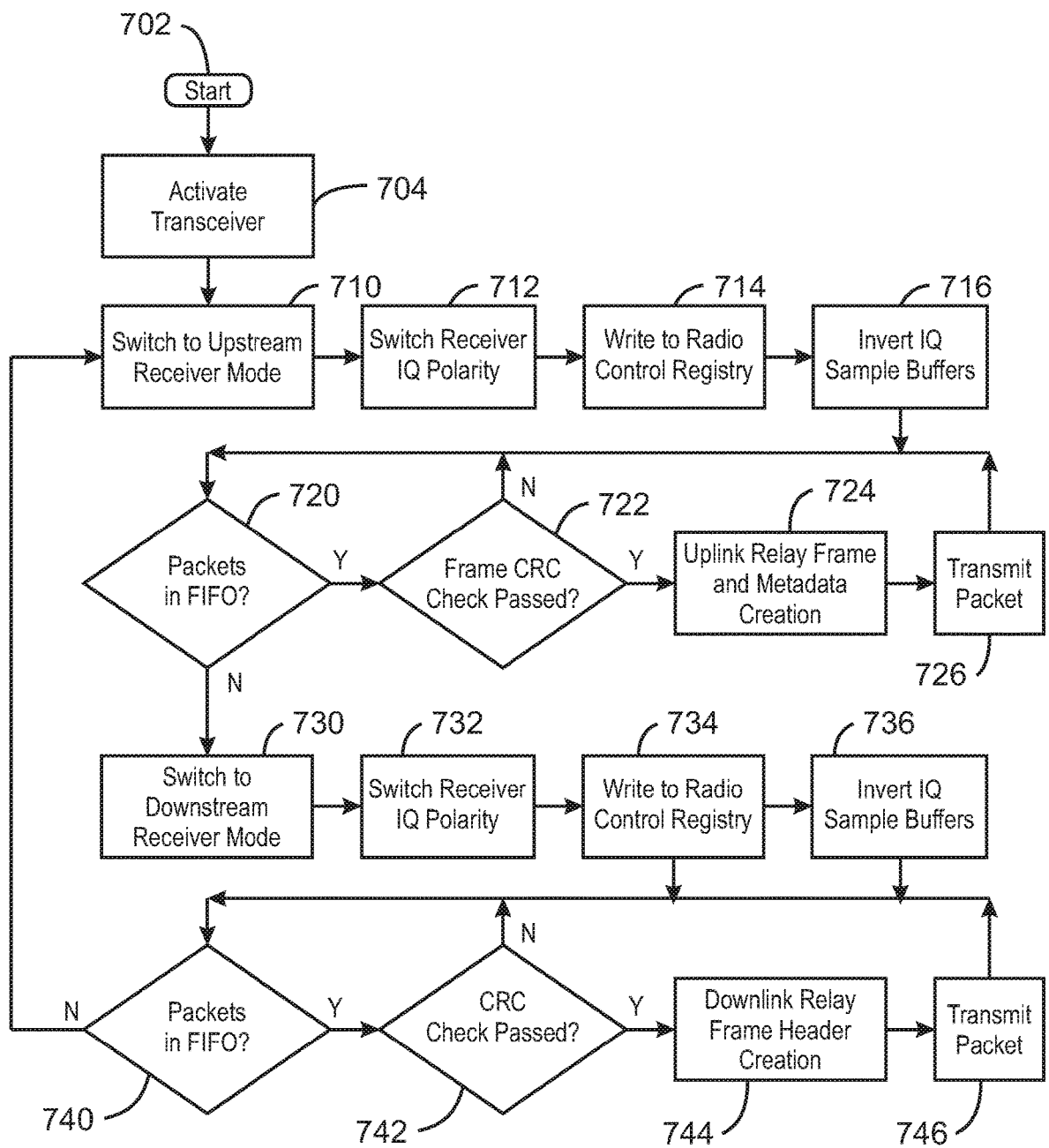
FIG. 7 illustrates relay control in accordance with some embodiments.

FIG. 7 illustrates relay control 700 in accordance with some embodiments. In some embodiments, relay control 700 includes relay control and packet queue checking. In some embodiments, relay control 700 implements IoT device relay control. In some embodiments, relay control 700 can be implemented by one or more remote radio head (RRH) node operating in a relay mode such as, for example, RRH 504 or RRH 506.

Relay control 700 begins at 702. A transceiver of the relay device is activated at 704. In some embodiments an upstream mode or a downstream mode is enabled first. In some embodiments, the upstream mode or downstream mode is enabled based on the direction in which to listen for packets that require relay support. In some embodiments using LoRaWAN, for example, the upstream or downstream mode can be selected by switching the receiver IQ polarity through a registry write operation, for example. Relay control 700 illustrates first enabling an upstream mode, but it is noted that a downstream mode is enabled first in some embodiments.

Relay control 700 is switched to an upstream receiver mode at 710. At 712, the IQ polarity of the receiver (device) is switched. Then a write is made to the radio control registry at 714, and the IQ sample buffers are inverted at 716. At 720 a determination is made as to whether an upstream buffer (for example, a first in first out or FIFO buffer) contains packets. If the upstream buffer does contain packets at 720, a frame integrity check is performed to determine if the frame(s) is/are valid, and invalid frames can be dropped. For example, a frame CRC check can be performed, and a determination is made at 722 as to whether the frame CRC check passed. If the frame CRC check does not pass at 722, flow returns to 720. If the frame CRC check does pass at 722, a relay frame and metadata are created at 724. This metadata can include, for example, a set of control parameters that tell the radio how to treat the packet that needs to be transmitted. For example, a valid frame for relaying is passed to a stage that populates field values that are used by the recipient to determine the nature of the packet (for example, whether it is a relayed packet or a normal packet). The packet is then sent to the transceiver module and the packet is transmitted at 726. Flow then returns to 720.

If the buffer does not contain any packets at 720, the relay control switches the device to a downstream receiver mode at 730. At 732, the IQ polarity of the receiver (device) is switched. Then a write is made to the radio control registry at 734, and the IQ sample buffers are inverted at 736. If a downstream buffer (for example, downstream FIFO buffer) contains packets, they are validated and dispatched for relay transmission. At 740 a determination is made as to whether the downstream buffer (for example, a first in first out or FIFO buffer) contains packets. If the downstream buffer does contain packets at 740, a frame integrity check is performed to determine if the frame(s) is/are valid, and invalid frames can be dropped. For example, a frame CRC check can be performed, and a determination is made at 742 as to whether the frame CRC check passed. If the frame CRC check does not pass at 742, flow returns to 740. If the frame CRC check does pass at 742, a downlink relay frame header is created at 744. For example, a valid frame for relaying is passed to a stage that populates field values that are used by the recipient to determine the nature of the packet (for example, whether it is a relayed packet or a normal packet). The packet is then sent to the transceiver module and the packet is transmitted at 746. Flow then returns to 740. If the buffer does not contain any more packets at 740, relay control 700 flow returns the device to the upstream receiver mode at 710.

In this manner, according to some embodiments, relay control 700 can alternate between upstream relaying and downstream relaying using a single transceiver. Relay control 700 can use waveform inversion and time-triggered networking according to some embodiments to use IQ polarity to differentiate and detect upstream and downstream messages.

Figure 8:
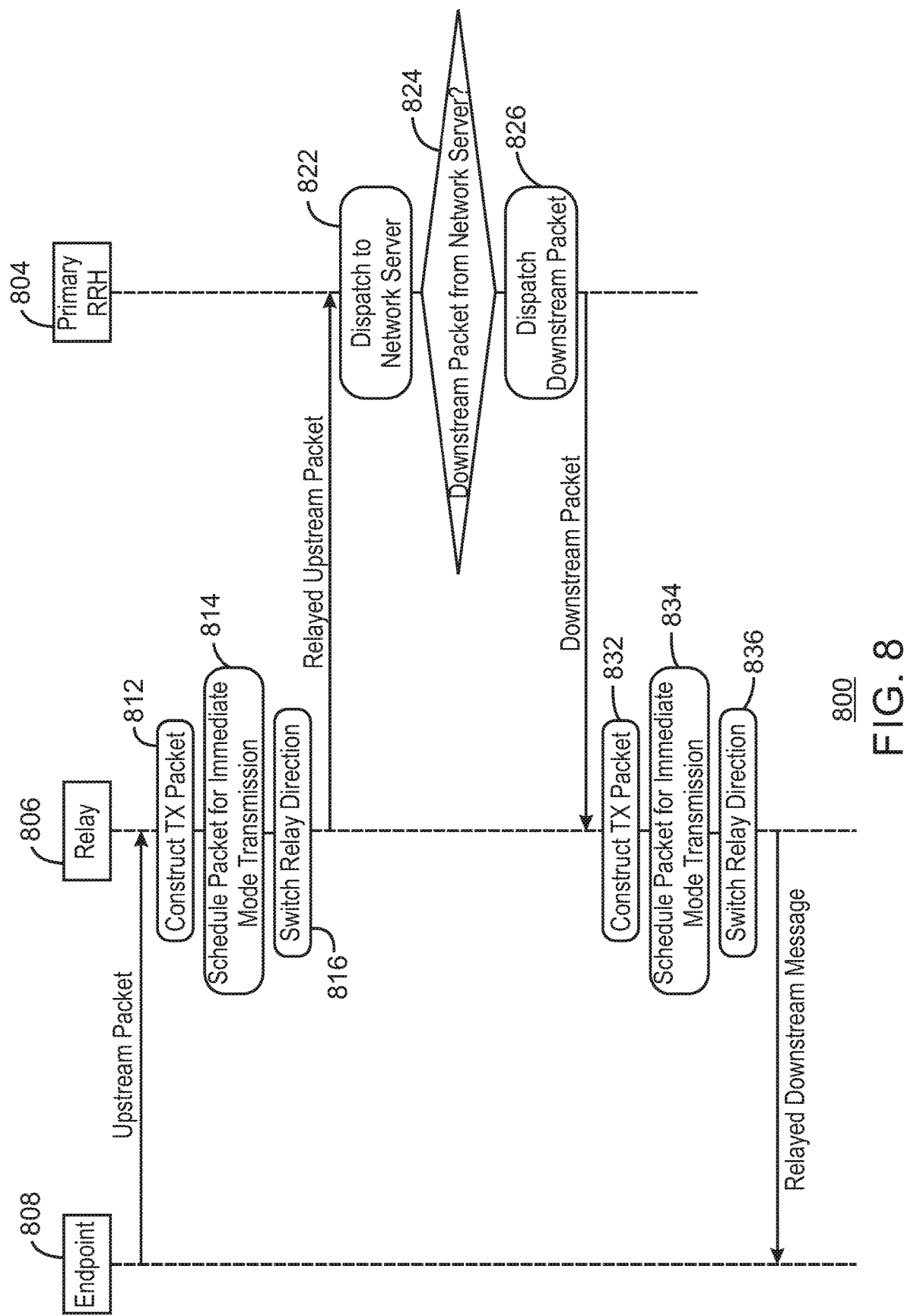
FIG. 8 illustrates relay control in accordance with some embodiments.

FIG. 8 illustrates relay transaction sequence control 800 in accordance with some embodiments. In some embodiments, relay control 800 includes relay control and packet queue checking. In some embodiments, relay control 800 implements IoT device relay control. In some embodiments, relay control 800 can be implemented in an IoT network such as network 500. FIG. 8 includes a device 804 such as one or more of a primary device, a relay device, a RRH, an IoT device, an edge device, a relay RRH, or a primary RRH, among others. In some embodiments, device 804 can be the same as or similar to RRH 504 of FIG. 5. FIG. 8 includes a device 806 such as one or more of a primary device, a relay device, a RRH, an IoT device, an edge device, a relay RRH, or a primary RRH, among others. In some embodiments, device 806 can be the same as or similar to RRH 506 of FIG. 5. FIG. 8 includes a device 808 such as one or more of an endpoint, an edge device or an IoT device, among others. In some embodiments, device 808 can be the same as or similar to endpoint 508 of FIG. 5. In some embodiments, any one or more of devices 804, 806, or 808 can be an IoT device such as, for example, IoT device 1200 of FIG. 12.

FIG. 8 illustrates a series of transactions between devices 804, 806 and 808 in accordance with some embodiments. In some embodiments, an upstream packet is transmitted from device 808 to device 806. Device 806 constructs a transmit packet at 812. The packet is scheduled for immediate mode transmission by device 806 at 814. Device 806 then switches it's relay direction at 816, and the relayed upstream packet is transmitted from device 806 to device 804. Device 804 dispatches the packet to a network server (for example, a network server such as a fog controller) at 822. Device 804 then waits for a downstream packet from the network server at 824. Once a downstream packet arrives from the network server, the device 804 dispatches the downstream packet and transmits it to device 806. Device 806 constructs the transmit packet at 832, and schedules the packet for immediate mode transmission at 834. Device 806 switches it's relay direction at 836. Device 806 then transmits the relayed downstream message to the device 808. In this manner, in accordance with some embodiments, relayed upstream packets can be forwarded from an endpoint such as device 804 via a relay such as device 806 and a primary device (or primary edge node) such as device 808 to a fog controller. Responses (or acknowledgements) from the fog controller can then be dispatched downstream via the primary edge node 804 and one or more relay nodes such as device 806 and other relay edge devices.

Figure 9:
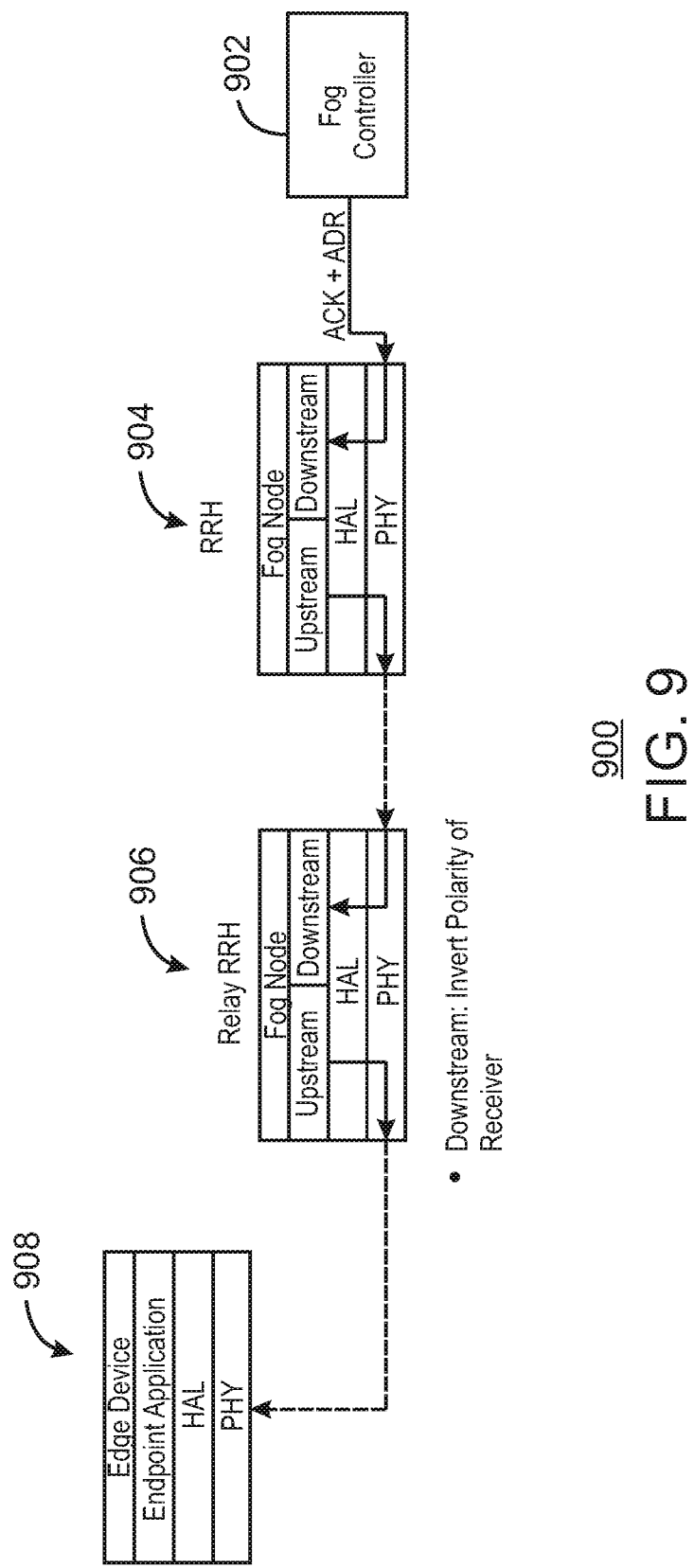
FIG. 9 illustrates relay sequencing in accordance with some embodiments.

FIG. 9 illustrates relay sequencing 900 in accordance with some embodiments. In some embodiments, FIG. 9 illustrates upstream relay sequencing. FIG. 9 includes a fog controller 902, an edge device 904 such as an RRH or fog node, a relay edge device 906 such as a relay RRH or fog node, and an edge device 908 such as an endpoint node. In some embodiments, a single relay node 906 connects one or more edge devices such as edge device 908 to fog controller 902. As illustrated in FIG. 9, relaying of upstream packets is implemented to relay packets from the fog controller 902 to the endpoint edge device 908. Once upstream packets are relayed by device 906, a polarity (for example, an IQ polarity) of the receiver in device 906 can be inverted to relay downstream packets.

Figure 10:
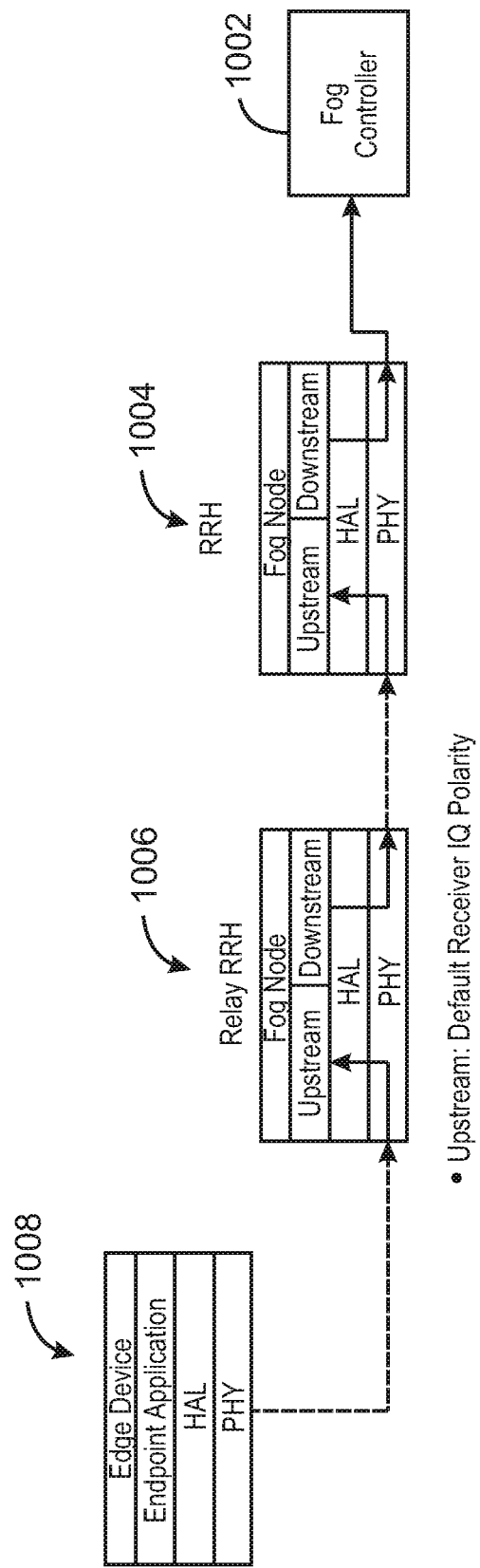
FIG. 10 illustrates relay sequencing in accordance with some embodiments.

FIG. 10 illustrates relay sequencing 1000 in accordance with some embodiments. In some embodiments, FIG. 10 illustrates downstream relay sequencing. FIG. 10 includes a fog controller 1002, an edge device 1004 such as an RRH or fog node, a relay edge device 1006 such as a relay RRH or fog node, and an edge device 1008 such as an endpoint node. In some embodiments, a single relay node 1006 connects one or more edge devices such as edge device 1008 to fog controller 1002. As illustrated in FIG. 10, relaying of downstream packets is implemented to relay packets from the endpoint edge device 1008 to the fog controller 1002. Once downstream packets are relayed by device 1006, a polarity (for example, an IQ polarity) of the receiver in device 1006 can be set to a default receiver IQ polarity to relay upstream packets.

Figure 11:
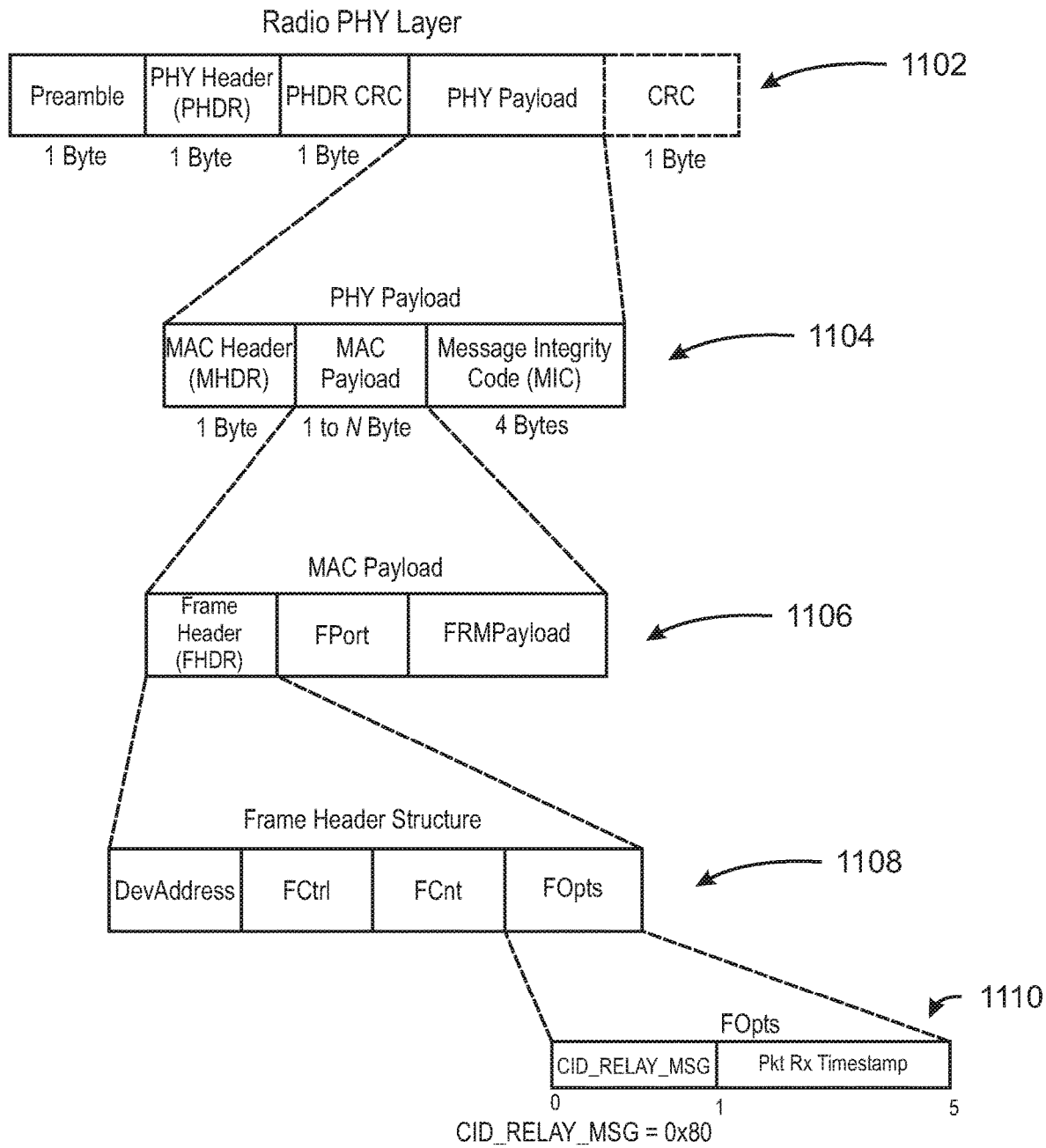
FIG. 11 illustrates a frame structure in accordance with some embodiments.

FIG. 11 illustrates a frame structure 1100 in accordance with some embodiments. FIG. 11 illustrates a radio PHY layer 1102, a PHY payload 1104, a MAC payload 1106, a frame header 1108, and frame options (FOpts) 1110. Frame structure 1100 can be used to relay metadata which are used by a fog controller to determine the nature of the packet and source, for example. The frame structure 1100 can include a low overhead frame structure extension that can minimize additional air time required to support increased frame header bytes. In some embodiments, the MAC header frame structure encapsulated in the PHY radio frame contains a relay byte indicator (for example, with a "0" value if direct, and a "1" value if a relayed message).

The MAC header frame also includes a timestamp field that can be used to inform the recipient (for example, a fog controller) of when the packet was received by the first relay node in the network (for example, a timestamp identifying when a sensor sensed something, when an endpoint device took a picture of something, etc). In some embodiments, the MAC payload in the PHY payload 1104 is illustrated as N bytes. In some embodiments, for example, this number of bytes can be different depending on whether the device is acting as a relay device or not. For example, the MAC payload size might be 250 bytes if the device is operating in normal mode, but 230 bytes if it is operating in a relay mode in accordance with some embodiments. Such a field can be appended to the relay packet for use in synchronizing events or other relay purposes in accordance with some embodiments. In some embodiments, for example, packets can be relayed in the same exact frequency spectrum in which they were received, or they can be relayed as an offset spectrum, or they can be relayed in a completely different frequency band, or using a different modulation scheme, etc., among other implementations.

Figure 12:
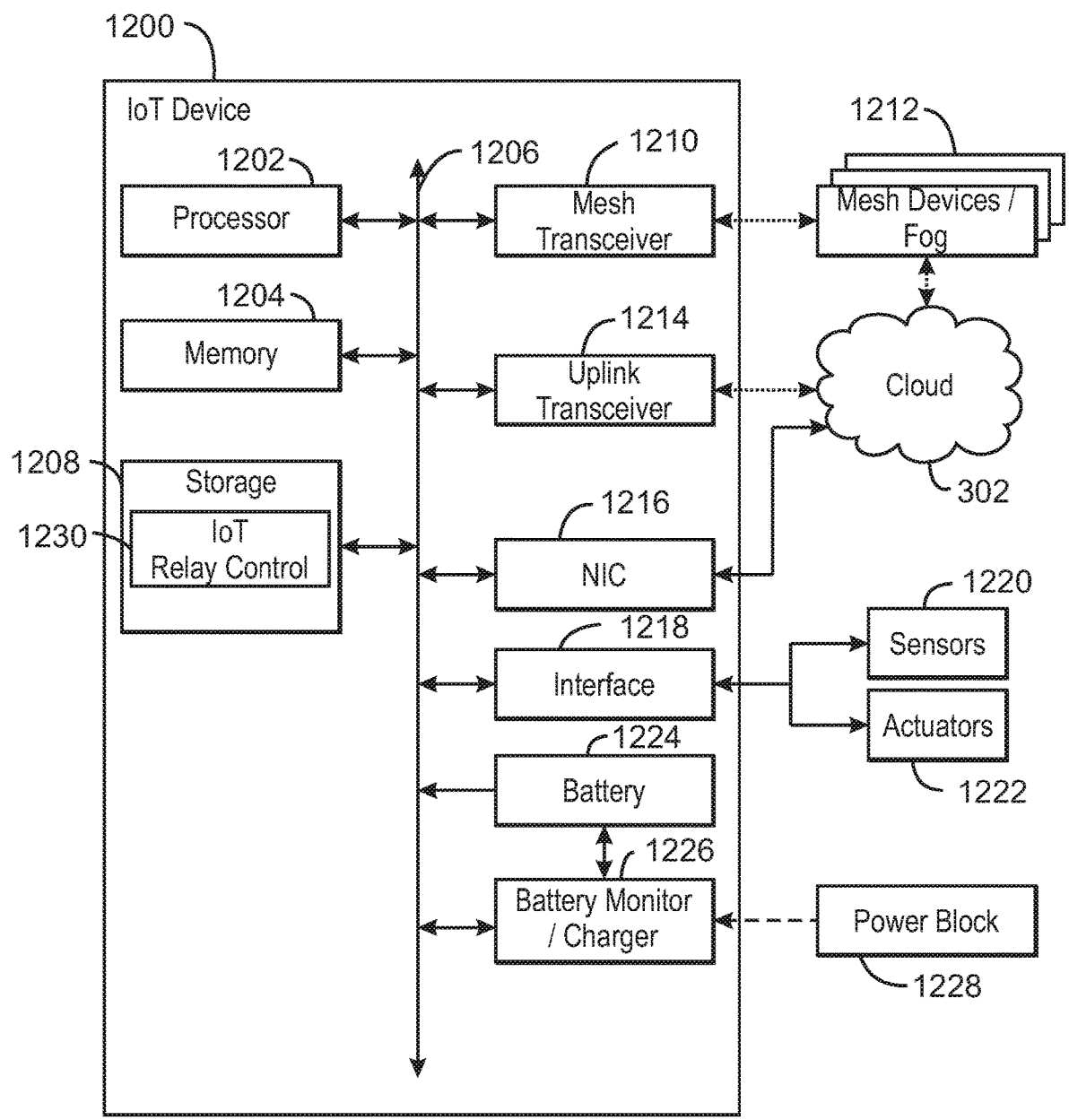
FIG. 12 is a block diagram of an example of components that may be present in an IoT device for implementing IoT relay control in accordance with some embodiments.

FIG. 12 is a block diagram of an example of components that may be present in an IoT device 1200 for implementing IoT relay control (for example, bi-directional IoT relay control). In some embodiments, IoT device 1200 can implement any of the techniques illustrated or described herein. The IoT device 1200 may include any combinations of the components shown in the example. The components may be implemented as ICs, portions thereof, discrete electronic devices, or other modules, logic, hardware, software, firmware, or a combination thereof adapted in the IoT device 1200, or as components otherwise incorporated within a chassis of a larger system. The block diagram of FIG. 12 is intended to show a high level view of components of the IoT device 1200. However, some of the components shown may be omitted, additional components may be present, and different arrangement of the components shown may occur in other implementations.

The IoT device 1200 may include a processor 1202, which may be a microprocessor, a multi-core processor, a multithreaded processor, an ultra-low voltage processor, an embedded processor, or other known processing element. The processor 1202 may be a part of a system on a chip (SoC) in which the processor 1202 and other components are formed into a single integrated circuit, or a single package, such as the Edison™ or Galileo™ SoC boards from Intel. As an example, the processor 1202 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1202 may communicate with a system memory 1204 over a bus 1206. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1208 may also be coupled to the processor 1202 via the bus 1206. To enable a thinner and lighter system design, the mass storage 1208 may be implemented via a solid state drive (SSD). Other devices that may be used for the mass storage 1208 include flash memory cards, such as SD cards, microSD cards, xD picture cards, and the like, and USB flash drives.

In low power implementations, the mass storage 1208 may be on-die memory or registers associated with the processor 1202. However, in some examples, the mass storage 1208 may be implemented using a micro hard disk drive (HDD). Further, any number of new technologies may be used for the mass storage 1208 in addition to, or instead of, the technologies described, such resistance change memories, phase change memories, holographic memories, or chemical memories, among others. For example, the IoT device 1200 may incorporate the 3D XPOINT memories from Intel® and Micron®.

The components may communicate over the bus 1206. The bus 1206 may include any number of technologies, including industry standard architecture (ISA), extended ISA (EISA), peripheral component interconnect (PCI), peripheral component interconnect extended (PCIx), PCI express (PCIe), or any number of other technologies. The bus 1206 may be a proprietary bus, for example, used in a SoC based system. Other bus systems may be included, such as an I2C interface, I3C interface, an SPI interface, point to point interfaces, and a power bus, among others.

The bus 1206 may couple the processor 1202 to a mesh transceiver 1210, for communications with other mesh devices 1212. The mesh transceiver 1210 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1212. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1210 may communicate using multiple standards or radios for communications at different range. For example, the IoT device 1200 may communicate with geographically proximate devices, e.g., within about 10 meters, using a local transceiver based on BLE, or another low power radio, to save power. More distant mesh devices 1212, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1210 may be incorporated into an MCU as an address directly accessible by the chip, such as in the Curie® units available from Intel.

An uplink transceiver 1214 may be included to communicate with devices in the cloud 302. The uplink transceiver 1214 may be LPWA transceiver that follows the IEEE 802.15.4, IEEE 802.15.4g, IEEE 802.15.4e, IEEE 802.15.4k, or NB-IoT standards, among others. The IoT device 1200 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, Weightless-P from the Weightless Special Interest Group, Random Phase Multiple Access (RPMA®) from Ingenu, and other technologies. Further, other communications techniques, such as time-slotted channel hopping, described in the IEEE 802.15.4e specification may be used.

Any number of other radio communications and protocols may be used in addition to the systems mentioned for the mesh transceiver 1210 and uplink transceiver 1214, as described herein. For example, the radio transceivers 1210 and 1212 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1210 and 1212 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1214, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1216 may be included to provide a wired communication to the cloud 302 or to other devices, such as the mesh devices 1212. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1216 may be included to allow connection to a second network, for example, a NIC 1216 providing communications to the cloud over Ethernet, and a second NIC 1216 providing communications to other devices over another type of network.

The bus 1206 may couple the processor 1202 to an interface 1218 that is used to connect external devices. The external devices may include sensors 1220, such as accelerometers, level sensors, flow sensors, temperature sensors, pressure sensors, barometric pressure sensors, and the like. The interface 1218 may be used to connect the IoT device 1200 to actuators 1222, such as power switches, valve actuators, an audible sound generator, a visual warning device, and the like.

While not shown, various input/output (I/O) devices may be present within, or connected to, the IoT device 1200. For example, a display may be included to show information, such as sensor readings or actuator position. An input device, such as a touch screen or keypad may be included to accept input.

A battery 1224 may power the IoT device 1200, although in examples in which the IoT device 1200 is mounted in a fixed location, it may have a power supply coupled to an electrical grid. The battery 1224 may be a lithium ion battery, a metal-air battery, such as a zinc-air battery, an aluminum-air battery, a lithium-air battery, a hybrid supercapacitor, and the like.

A battery monitor/charger 1226 may be included in the IoT device 1200 to track the state of charge (SoCh) of the battery 1220. The battery monitor/charger 1226 may be used to monitor other parameters of the battery 1224 to provide failure predictions, such as the state of health (SoH) and the state of function (SoF) of the battery 1224. The battery monitor/charger 1226 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1226 may communicate the information on the battery 1224 to the processor 1202 over the bus 1206. The battery monitor/charger 1226 may also include an analog-to-digital (ADC) convertor that allows the processor 1202 to directly monitor the voltage of the battery 1226 or the current flow from the battery 1224. The battery parameters may be used to determine actions that the IoT device 1200 may perform, such as transmission frequency, mesh network operation, sensing frequency, and the like.

A power block 1228, or other power supply coupled to a grid, may be coupled with the battery monitor/charger 1226 to charge the battery 1224. In some examples, the power block 1228 may be replaced with a wireless power receiver to obtain the power wirelessly, for example, through a loop antenna in the IoT device 1200. A wireless battery charging circuit, such as an LTC4020 chip from Linear Technologies of Milpitas, Calif., among others, may be included in the battery monitor/charger 1226. The specific charging circuits chosen depend on the size of the battery 1224, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1228 may be augmented or replaced with solar panels, a wind generator, a water generator, or other natural power systems.

The mass storage 1208 may include a number of modules to implement IoT relay control (for example, bi-directional IoT relay control), or any other techniques described herein. Although shown as code blocks in the mass storage 1208, it may be understood that any of the modules may be fully or partially replaced with hardwired circuits, for example, built into an application specific integrated circuit (ASIC). The mass storage 1208 may include IoT relay control 1230 according to some embodiments. IoT relay control 1230 can include code to implement any of the techniques described herein, including bi-directional IoT relay control. In some embodiments, IoT device 1200 can include a system or a subsystem to implement any of the techniques described herein. For example, in some embodiments, IoT device 1200 can be or can include a system or subsystem such as, for example, an edge device or a fog device such one or more of RRH 504, RRH 506, or fog controller 502.

Examples and embodiments of various techniques have been illustrated and described herein as being implemented, for example, using a processor executing stored instructions. However, it is noted that other examples and embodiments of any of these techniques can includes other implementations. For example, any of the techniques illustrated or described herein can be implemented in any of hardware, software, firmware, or in any combination thereof. Some embodiments can be implemented, for example, using an Application Specific Integrated Circuit (ASIC) or a Field Programmable Gate Array (FPGA), among others.

Figure 13:
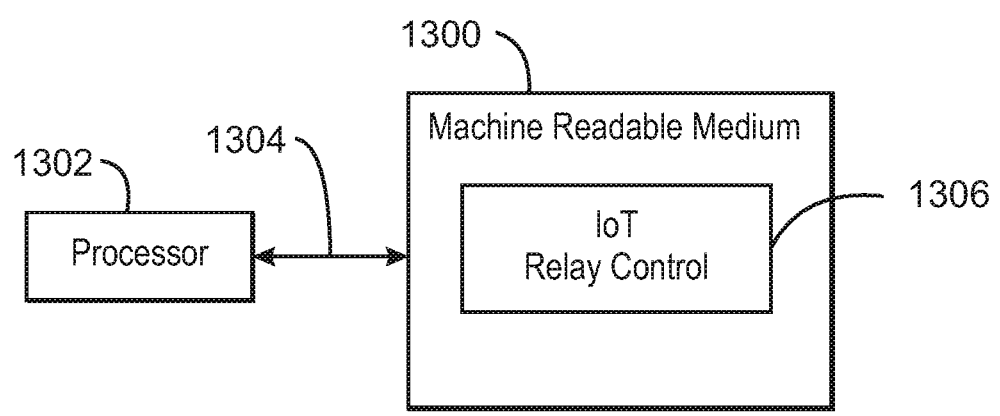
FIG. 13 is a block diagram of a non-transitory, machine readable medium including code to direct a processor to implement IoT relay control in accordance with some embodiments.

FIG. 13 is a block diagram of an exemplary non-transitory, machine readable medium 1300 including code to direct a processor 1302 to implement IoT relay control in accordance with some embodiments. The processor 1302 may access the non-transitory, machine readable medium 1300 over a bus 1304. The processor 1302 and bus 1304 may be selected as described with respect to the processor 1202 and bus 1206 of FIG. 12. The non-transitory, machine readable medium 1300 may include devices described for the mass storage 1208 of FIG. 12 or may include optical disks, thumb drives, or any number of other hardware devices.

The non-transitory, machine readable medium 1300 may include code 1306 to direct the processor 1302 to implement any of the techniques described herein, including one or more of IoT relay control or bi-directional IoT relay control, among others.

In some embodiments, the techniques described herein can be implemented by a processor such as processor 1202 or processor 1302 running software or firmware, or some combination thereof. However, in some embodiments, the techniques described herein may be implemented using other types of processors or controllers. For example, in some embodiments, the techniques described herein may be implemented by an FPGA (field programmable gate array), for example.

The techniques described herein may be used to implement any number of IoT networks for various purposes. Additional applications may be implemented.

Example 1 includes an Internet of Things (IoT) device including a transceiver to transmit and receive data packets and a controller to alternate between upstream and downstream relaying of data packets via the transceiver.

Example 2 includes the subject matter of example 1. In example 2, the transceiver is a low power wireless transceiver Example 3 includes the subject matter of any of examples 1-2. In example 3, the low power wireless transceiver is a LoRaWAN transceiver.

Example 4 includes the subject matter of any of examples 1-3. In example 4, the controller is to control the transceiver to enter an upstream mode to identify packets that require upstream relay support and to control the transceiver to enter a downstream mode to identify packets that require downstream relay support.

Example 5 includes the subject matter of example any of examples 1-4. In example 5, the controller is to determine if a received packet is a normal packet or a packet that requires relay support.

Example 6 includes the subject matter of any of examples 1-5. In example 6, the controller is to switch a receiver IQ polarity (In-phase and Quadrature polarity) of the transceiver when switching between an upstream relay mode and a downstream relay mode.

Example 7 includes the subject matter of any of examples 1-6. In example 7, the controller is to identify receipt of a packet to be relayed. In response to the receipt of the packet to be relayed, the controller is to construct a relayed transmit packet, to control the transceiver to relay the packet, and to switch a relay direction.

Example 8 includes the subject matter of any of examples 1-7. In example 8, the IoT device is an edge relay device.

Example 9 includes the subject matter of any of examples 1-8. In example 9, the IoT device is to relay data packets between a fog controller and an edge device.

Example 10 includes a machine-implemented method for relaying data packets in an Internet of Things (IoT) network including transmitting and receiving data packets that require upstream or downstream relay support. The machine-implemented method also includes alternating between upstream and downstream relaying of received data packets that require upstream or downstream relay support.

Example 11 includes the subject matter of example 10. In example 11, the transmitting and receiving includes long range low power wireless transmitting and receiving.

Example 12 includes the subject matter of any of examples 10-11. In example 12, the method includes entering an upstream mode to identify packets that require upstream relay support, and entering a downstream mode to identify packets that require downstream relay support.

Example 13 includes the subject matter of any of examples 10-12. In example 13, the method includes determining if a received packet is a normal packet or a packet that requires relay support.

Example 14 includes the subject matter of any of examples 10-13. In example 14, the method includes switching a receiver IQ polarity when switching between an upstream relay mode and a downstream relay mode.

Example 15 includes the subject matter of any of examples 10-14. In example 15, the method includes identifying receipt of a packet to be relayed. In response to the receipt of the packet to be relayed, the method includes constructing a relayed transmit packet, relaying the packet, and switching a relay direction.

Example 16 includes the subject matter of any of examples 10-15. In example 16, the IoT network is an edge/fog network.

Example 17 includes the subject matter of any of examples 10-16. In example 17, the method includes relaying the data packets between a fog controller and an edge device.

Example 18 includes a non-transitory computer readable medium comprising instructions that, when executed, direct a processor to transmit and receive Internet of Things (IoT) network data packets that require upstream or downstream relay support, and alternate between upstream and downstream relaying of received data packets that require upstream or downstream relay support.

Example 19 includes the subject matter of example 18. In example 19, the non-transitory computer readable medium includes instructions that, when executed, direct a processor to transmit and receive the data packets using long range low power wireless transmission.

Example 20 includes the subject matter of any of examples 18-19. In example 20, the non-transitory computer readable medium includes instructions that, when executed, direct a processor to enter an upstream mode to identify packets that require upstream relay support, and to enter a downstream mode to identify packets that require downstream relay support.

Example 21 includes the subject matter of any of examples 18-20. In example 21, the non-transitory computer readable medium includes instructions that, when executed, direct a processor to determine if a received packet is a normal packet or a packet that requires relay support.

Example 22 includes the subject matter of any of examples 18-21. In example 22, the non-transitory computer readable medium includes instructions that, when executed, direct a processor to switch a receiver IQ polarity when switching between an upstream relay mode and a downstream relay mode.

Example 23 includes the subject matter of any of examples 18-22. In example 23, the non-transitory computer readable medium includes instructions that, when executed, direct a processor to identify receipt of a packet to be relayed, and in response to the receipt of the packet to be relayed, to construct a relayed transmit packet, to relay the packet, and to switch a relay direction.

Example 24 includes the subject matter of any of examples 18-23. In example 24, the IoT network is an edge/fog network.

Example 25 includes the subject matter of any of examples 18-24. In example 25, the non-transitory computer readable medium includes instructions that, when executed, direct a processor to relay the data packets between a fog controller and an edge device.

Example 26 includes an Internet of Things (IoT) network including a first IoT device, a second IoT device, and a third IoT device. The third IoT device includes a transceiver to transmit data packets to the first IoT device and the second IoT device, and to receive data packets from the first IoT device and the second IoT device. The third IoT device also includes a controller to alternate between upstream and downstream relaying of data packets between the first IoT device and the second IoT device via the transceiver.

Example 27 includes the subject matter of example 26. In example 27, the transceiver is a low power wireless transceiver.

Example 28 includes the subject matter of any of examples 26-27. In example 28, the low power wireless transceiver is a LoRaWAN transceiver.

Example 29 includes the subject matter of any of examples 26-28. In example 29, the controller is to control the transceiver to enter an upstream mode to identify packets that require upstream relay support and to control the transceiver to enter a downstream mode to identify packets that require downstream relay support.

Example 30 includes the subject matter of any of examples 26-29. In example 30, the controller is to determine if a received packet is a normal packet or a packet that requires relay support.

Example 31 includes the subject matter of any of examples 26-30. In example 31, the controller is to switch a receiver IQ polarity of the transceiver when switching between an upstream relay mode and a downstream relay mode.

Example 32 includes the subject matter of any of examples 26-31. In example 32, the controller is to identify receipt of a packet to be relayed. In response to the receipt of the packet to be relayed, the controller is to construct a relayed transmit packet, to control the transceiver to relay the packet, and to switch a relay direction.

Example 33 includes the subject matter of any of examples 26-32. In example 33, the third IoT device is an edge relay device.

Example 34 includes the subject matter of any of examples 26-33. In example 34, the first IoT device is a fog controller and the second IoT device is an edge device. The third IoT device is to relay data packets between the fog controller and the edge device.

Example 35 includes an Internet of Things (IoT) device. The IoT device includes means for transmitting data packets, means for receiving data packets, and means for alternating between upstream and downstream relaying of data packets via the means for transmitting and the means for receiving.

Example 36 includes the subject matter of example 35. In example 36, the transceiver is a low power wireless transceiver.

Example 37 includes the subject matter of any of examples 35-36. In example 37, the low power wireless transceiver is a LoRaWAN transceiver.

Example 38 includes the subject matter of any of examples 35-37. In example 38, the IoT device includes means for controlling the means for receiving to enter an upstream mode to identify packets that require upstream relay support and to enter a downstream mode to identify packets that require downstream relay support.

Example 39 includes the subject matter of any of examples 35-38. In example 39, the IoT device includes means for determining if a received packet is a normal packet or a packet that requires relay support.

Example 40 includes the subject matter of any of examples 35-39. In example 40, the IoT device includes means for switching a receiver IQ polarity of the transceiver when switching between an upstream relay mode and a downstream relay mode.

Example 41 includes the subject matter of any of examples 35-40. In example 41, the IoT device includes for identifying receipt of a packet to be relayed, means for constructing a relayed transmit packet in response to the receipt of the packet to be relayed, means for controlling the transceiver to relay the packet in response to the receipt of the packet to be relayed, and means for switch a relay direction in response to the receipt of the packet to be relayed.

Example 42 includes the subject matter of any of examples 35-41. In example 42, the IoT device is an edge relay device.

Example 43 includes the subject matter of any of examples 35-42. In example 43, the IoT device includes means for relaying data packets between a fog controller and an edge device.

Example 44 includes an apparatus including means to perform a method as in any other example.

Example 45 includes machine-readable storage including machine-readable instructions, when executed, to implement a method or realize an apparatus as in any other example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An Internet of Things (IoT) device, comprising:
   a transceiver to transmit and receive data packets; and
   a controller to:
      alternate between upstream and downstream relaying of data packets via the transceiver;
      identify receipt of a packet to be relayed; and
      in response to receipt of the packet to be relayed, construct a relayed transmit packet, control the transceiver to relay the packet, and switch a relay direction,
   wherein the IoT device is an edge relay device or a MEC device.

2. The IoT device of claim 1, wherein the transceiver is a low power wireless transceiver.

3. The IoT device of claim 2, wherein the low power wireless transceiver is a LoRaWAN transceiver.

4. The IoT device of claim 1, the controller to control the transceiver to enter an upstream mode to identify packets that require upstream relay support and to control the transceiver to enter a downstream mode to identify packets that require downstream relay support.

5. The IoT device of claim 1, the controller to determine if a received packet is a normal packet or a packet that requires relay support.

6. The IoT device of claim 1, the controller to switch a polarity of the transceiver when switching between an upstream relay mode and a downstream relay mode.

7. The IoT device of claim 1, wherein the IoT device is to relay data packets between a fog controller and an edge device.

8. A machine-implemented method for relaying data packets in an Internet of Things (IoT) network, comprising:
   transmitting and receiving data packets that require upstream or downstream relay support at an IoT device in the IoT network, wherein the IoT device is an edge relay device or a MEC device;
   alternating between upstream and downstream relaying of received data packets that require upstream or downstream relay support;
   identifying receipt of a packet to be relayed; and in response to the receipt of the packet to be relayed, constructing a relayed transmit packet, relaying the packet, and switching a relay direction.

9. The machine-implemented method of claim 8, comprising:
   entering an upstream mode to identify packets that require upstream relay support; and
   entering a downstream mode to identify packets that require downstream relay support.

10. The machine-implemented method of claim 8, comprising determining if a received packet is a normal packet or a packet that requires relay support.

11. The machine-implemented method of claim 8, comprising switching a receiver polarity when switching between an upstream relay mode and a downstream relay mode.

12. A non-transitory computer readable medium comprising instructions that, when executed, direct a processor of an Internet of Things (IoT) device to:
   transmit and receive Internet of Things (IoT) network data packets that require upstream or downstream relay support;
   alternate between upstream and downstream relaying of received data packets that require upstream or downstream relay support;
   identify receipt of a packet to be relayed; and
   in response to the receipt of the packet to be relayed, construct a relayed transmit packet, control relaying of the packet, and switch a relay direction,
   wherein the IoT device is an edge relay device or a MEC device.

13. The non-transitory computer readable medium of claim 12, comprising instructions that, when executed, direct a processor to:
   transmit and receive the data packets using long range low power wireless transmission.

14. The non-transitory computer readable medium of claim 12, comprising instructions that, when executed, direct a processor to:
   enter an upstream mode to identify packets that require upstream relay support; and
   enter a downstream mode to identify packets that require downstream relay support.

15. The non-transitory computer readable medium of claim 12, comprising instructions that, when executed, direct a processor to determine if a received packet is a normal packet or a packet that requires relay support.

16. The non-transitory computer readable medium of claim 12, comprising instructions that, when executed, direct a processor to switch a receiver polarity when switching between an upstream relay mode and a downstream relay mode.

17. The non-transitory computer readable medium of claim 12, wherein the IoT network is an edge/fog network.

18. The non-transitory computer readable medium of claim 12, wherein the IoT network is a MEC network.

19. The non-transitory computer readable medium of claim 12, comprising instructions that, when executed, direct a processor to relay the data packets between a fog controller and an edge device.

20. An Internet of Things (IoT) network, comprising:
   a first IoT device;
   a second IoT device; and
   a third IoT device, comprising:
      a transceiver to transmit data packets to the first IoT device and the second IoT device, and to receive data packets from the first IoT device and the second IoT device; and
      a controller to:
         alternate between upstream and downstream relaying of data packets between the first IoT device and the second IoT device via the transceiver;
         identify receipt of a packet to be relayed;
         in response to receipt of the packet to be relayed, construct a relayed transmit packet, control the transceiver to relay the packet, and switch a relay direction; and
         switch a polarity of the transceiver when switching between an upstream relay mode and a downstream relay mode.

21. The IoT network of claim 20, the controller to control the transceiver to enter an upstream mode to identify packets that require upstream relay support and to control the transceiver to enter a downstream mode to identify packets that require downstream relay support.

22. The IoT network of claim 20, the controller to determine if a received packet is a normal packet or a packet that requires relay support.

* * * * *